(12) United States Patent
Emerson et al.

(10) Patent No.: US 8,875,864 B2
(45) Date of Patent: Nov. 4, 2014

(54) CONTINUOUS OPERATION PORTABLE MATERIAL HANDLING SYSTEM

(71) Applicants: Paul Emerson, Nine Mile Falls, WA (US); Glenn Davis, Spokane, WA (US)

(72) Inventors: Paul Emerson, Nine Mile Falls, WA (US); Glenn Davis, Spokane, WA (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 14/349,733

(22) PCT Filed: Oct. 1, 2012

(86) PCT No.: PCT/US2012/058235
§ 371 (c)(1),
(2), (4) Date: Apr. 4, 2014

(87) PCT Pub. No.: WO2013/052400
PCT Pub. Date: Apr. 11, 2013

(65) Prior Publication Data
US 2014/0284172 A1    Sep. 25, 2014

Related U.S. Application Data

(60) Provisional application No. 61/542,838, filed on Oct. 4, 2011.

(51) Int. Cl.
*B65G 65/28*    (2006.01)
*B65G 41/00*    (2006.01)
*B65G 21/10*    (2006.01)

(52) U.S. Cl.
CPC .............. *B65G 65/28* (2013.01); *B65G 41/008* (2013.01); *B65G 2201/04* (2013.01); *B65G 21/10* (2013.01)
USPC ............ 198/303; 198/300; 198/301; 198/586

(58) Field of Classification Search
CPC ...... B65G 41/02; B65G 41/008; B65G 21/10; B65G 65/28
USPC ......... 198/300, 301, 303, 315, 317, 570, 578, 198/586
See application file for complete search history.

(56) References Cited

U.S. PATENT DOCUMENTS 4,646,906 A    3/1987  Wilcox, Jr. et al.
4,653,961 A *  3/1987  Hashimoto ............... 405/258.1

(Continued)

OTHER PUBLICATIONS

The International Search Report and Written Opinion dated Dec. 27, 2012, 6 pages.

*Primary Examiner* — Leslie A Nicholson, III
(74) *Attorney, Agent, or Firm* — Matthew R. Weaver; Aaron M. Pile; Jeffrey A. Sharp (57) ABSTRACT

A system and method for material handling includes a first portable conveyor for feeding material to a mobile bridge conveyor for the material to be stacked via a stacker until a discharge end of the mobile bridge conveyor is at or within a predetermined distance of a discharge end of the first portable conveyor. The first portable conveyor moves away from the mobile bridge conveyor after the discharge end of mobile bridge conveyor is at or within the predetermined distance of the discharge end of the first portable conveyor. A second portable conveyor that feeds material to the first portable conveyor rotates such that a discharge end of the second portable conveyor is moved towards the mobile bridge conveyor until reaching a feeding position for feeding material to the mobile bridge.

20 Claims, 9 Drawing Sheets

(56) References Cited

U.S. PATENT DOCUMENTS

| | | | |
|---|---|---|---|
| 5,234,094 A * | 8/1993 | Weyermann et al. | 198/303 |
| 6,085,890 A | 7/2000 | Kelly et al. | |
| 7,108,124 B2 | 9/2006 | Bernard et al. | |
| 7,270,227 B2 | 9/2007 | Bender et al. | |
| 7,284,650 B2 * | 10/2007 | Hoffmann | 198/303 |
| 8,276,736 B2 * | 10/2012 | Steele | 198/303 |

* cited by examiner

CONTINUOUS OPERATION PORTABLE MATERIAL HANDLING SYSTEM

FIELD OF INVENTION

The present invention relates to material handling and, more particularly, relates to apparatuses and methods for stacking material such as ores, minerals, comminuted material, agglomerated material, rock, or stone.

BACKGROUND OF THE INVENTION

Traditional material handling systems often utilize conveyor devices configured to transport substantial amount of material. Examples of material handling systems that utilize conveyor devices may be appreciated from U.S. Pat. Nos. 7,191,888, 6,782,993, 6,155,400, 6,085,890, 5,609,397, 5,562,194, 5,090,549, 4,139,087, 3,604,757, 2,851,150 and 1,996,488, and U.S. Patent Application Publication Nos. 2011/0132719, 2010/0314214, 2010/0288603, and 2007/0102263.

Conveyor systems used for stacking material may include a system configured for using radial stackers and grasshopper conveyors, for example. The radial stacker in such systems is configured to work in a circular path and often has an extendable conveyor head to increase the time between stack moves. The system is set up at an initial location with the stacker at its initial position. Once the radial stacker completes its first rotation, the head of the stacker may be extended or retracted and the stacker could reverse its path to further stack material. This process may continue until the stacker has stacked a distance equal to the extension/retraction length of the extendable conveyor head. The stacker and single section bridge then may index forwards or backwards to a new location to stack additional material.

Movement to the new location often takes a significant amount of time. For instance, the stacker may need to be moved by a lifting device or by towing the stacker. In this type of system, the stacker tail end is often supported by the head end of a single section bridge conveyor. The single section bridge conveyor either pushes or pulls the stacker depending on whether the stacker is advance or retreat stacking. Grasshopper conveyors may be positioned adjacent to the single section bridge conveyor to transfer material to the single section bridge conveyor feeding the stacker. For advance stacking versions of this system, grasshopper conveyors may be added to the system. For retreat stacking versions of this system, grasshopper conveyors may be removed from such a system. Grasshopper conveyor systems are usually only used for retreat stacking.

As the single section bridge conveyor moves, it travels under the discharge of a unique inclined cross conveyor that transports material from a grass hopper conveyor to a bridge conveyor for feeding material to the stacker. Once the bridge conveyor has moved a distance equal to the length of a grasshopper conveyor, the grasshopper conveyor is removed or added for stacking material at another position. Movement of the single section bridge conveyor, inclined cross conveyor, and stacker when adding or removing a grasshopper conveyor usually requires the system to be shut down. Additionally, movement of the grasshopper conveyors for adding or removing grasshopper conveyors typically requires the system to be shut down. Such shut downs require significant costs to be incurred. For instance, the entire material handling process may need to be shut down to accommodate movement of the grasshopper conveyor, stacker and bridge conveyor. The costs associated with such a shut down may range from 50,000 to 150,000 dollars in a mid sized material handling system that may be configured for handling 10,000 to 50,000 tons of material per day A new material handling system is needed that permits material to be stacked without the need to shut down a material handling operation to accommodate movement of a stacker, section bridge conveyor, or the removal of portable conveyors used to feed material to the stacker. Preferably, such a system is able to be utilized for retreat stacking and permits continuous material throughput throughout the stacking of material into a cell of a storage area. The system also preferably does not require the use of any inclined cross conveyor or other type of cross conveyor for feeding material from a portable conveyor to a bridge conveyor for stacking the material via a stacker.

SUMMARY OF THE INVENTION

A material handling system is provided that includes a stacker, a mobile bridge conveyor, and portable conveyors. Each of the portable conveyors includes a frame and at least one track assembly attached to the frame. The at least one track assembly is positioned adjacent to one end of the frame. The stacker is positionably adjacent to the mobile bridge conveyor to receive material from the mobile bridge conveyor for stacking the material in a storage area. The first end of a first portable conveyor is positionably adjacent the second end of a second portable conveyor to receive material from the second portable conveyor. The first portable conveyor also positionable to extend on an angle relative to the second portable conveyor toward the mobile bridge conveyor to feed material from the second end of the first portable conveyor to the mobile bridge conveyor. The first portable conveyor is able to move away from the mobile bridge conveyor, the second portable conveyor, and the stacker when an end of the mobile bridge conveyor that feeds the stacker is detected as being at or within a predetermined distance of the second end of the first portable conveyor. The second portable conveyor rotates via the at least one track assembly such that the second end of the second portable conveyor moves toward the mobile bridge conveyor until reaching a feeding position in which the material being fed from the second end of the second portable conveyor is fed to the mobile bridge conveyor.

Preferably, the frame of each portable conveyor is arranged to support a conveyor belt that extends from the first end to the second end along an inclined path such that a portion of the conveyor belt adjacent the first end is lower than a portion of the conveyor belt adjacent the second end. Each of the portable conveyors may also include at least one moveable foot positioned adjacent to the first end. The at least one moveable foot is moveable from a retracted position to an extended position. The at least one moveable foot of the second portable conveyor may be in the extended position to support the first end of the second portable conveyor prior to the second portable conveyor rotating toward the mobile bridge conveyor and the at least one moveable foot of the first portable conveyor may be retracted to the retracted position prior to moving away from the second portable conveyor, the mobile bridge conveyor, and the stacker.

A portable generator is connectable to the first portable conveyor to power the first portable conveyor prior to the first portable conveyor moving away from the second portable conveyor, the mobile bridge conveyor, and the stacker.

In some embodiments, material may be fed along the second portable conveyor as it rotates towards the mobile bridge conveyor such that material is discharged from the second end of the second portable conveyor prior to the second portable conveyor being positioned in the feeding position when the second portable conveyor rotates toward the feeding position. The second portable conveyor may begin rotating toward the feeding position when the first portable conveyor begins moving away from the second portable conveyor, the mobile bridge conveyor, and the stacker.

A method for stacking material is also provided. The method includes the steps of providing a plurality of portable conveyors comprising a first portable conveyor and a second portable conveyor and arranging the portable conveyors in a string of portable conveyors for transporting material via the portable conveyors to a mobile bridge conveyor. A stacker and the mobile bridge conveyor moves away from a pile of material being stacked while the stacker stacks the material in a storage area. The first portable conveyor feeds material to the mobile bridge conveyor for the material to be stacked via the stacker until a discharge end of the mobile bridge conveyor is at or within a predetermined distance of a discharge end of the first portable conveyor. The second portable conveyor feeds material to the first portable conveyor for feeding to the mobile bridge conveyor until a discharge end of the mobile bridge conveyor is at or within a predetermined distance of a discharge end of the first portable conveyor. The first portable conveyor moves away from the mobile bridge conveyor, the second portable conveyor, and the stacker after the discharge end of the mobile bridge conveyor is at or within the predetermined distance of the discharge end of the first portable conveyor. The second portable conveyor rotates such that a discharge end of the second portable conveyor is moved towards the mobile bridge conveyor until reaching a feeding position for feeding material to the mobile bridge conveyor.

In some embodiments of the method, the method may also include additional steps. For instance, the portable conveyors may also comprise a third portable conveyor and the second portable conveyor may move away from the mobile bridge conveyor and the stacker when the discharge end of the mobile bridge conveyor that feeds the stacker is detected as being at or within a predetermined distance of the discharge end of the second portable conveyor. While the second portable conveyor moves away from the mobile bridge conveyor and the stacker, the third portable conveyor may rotate such that a discharge end of the third portable conveyor moves toward the mobile bridge conveyor until reaching a feeding position so that the third portable conveyor feeds material to the mobile bridge conveyor when in the feeding position.

Some embodiments of the method may also include discharging material from the discharge end of the second portable conveyor as it rotates towards the mobile bridge conveyor for being positioned in the feeding position such that material is discharged from the second end of the second portable conveyor prior to the second portable conveyor being positioned in the feeding position. The rotating of the second portable conveyor may occur while the first portable conveyor is moving away from the stacker and the mobile bridge conveyor. The material discharged from the second end of the second portable conveyor prior to the second portable conveyor being positioned in the feeding position may be moved by a bulldozer or other mechanical means to a pile of material being stacked by the stacker.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of the material handling system are shown in the accompanying drawings and certain present preferred methods of practicing the same are also illustrated therein.

DETAILED DESCRIPTION OF PRESENT PREFERRED EMBODIMENTS

Referring to FIGS. 1-9, a material handling system 1 utilizes a string of interconnected portable conveyors 2 for transporting material from an overland feed conveyor (not shown) to a mobile bridge conveyor 4 for stacking via a stacker 6 that receives material from the mobile bridge conveyor 4. The material may be stacked in piles of material 5 that are positioned in different cells 7 of a storage area 8.

Figure 1:
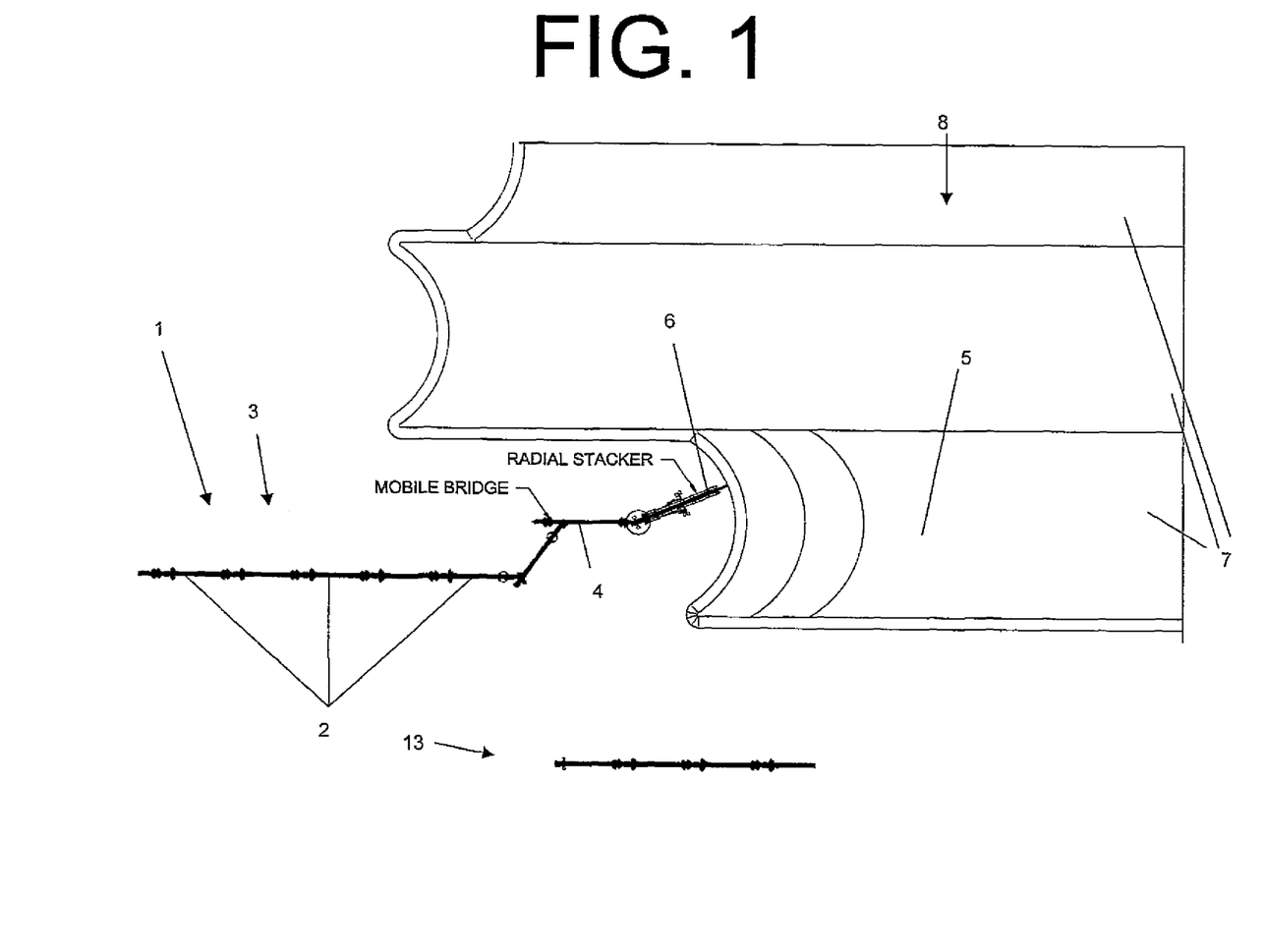
FIG. 1 is a top view of a present preferred material handling system that may be utilized to stack material.
Figure 2:
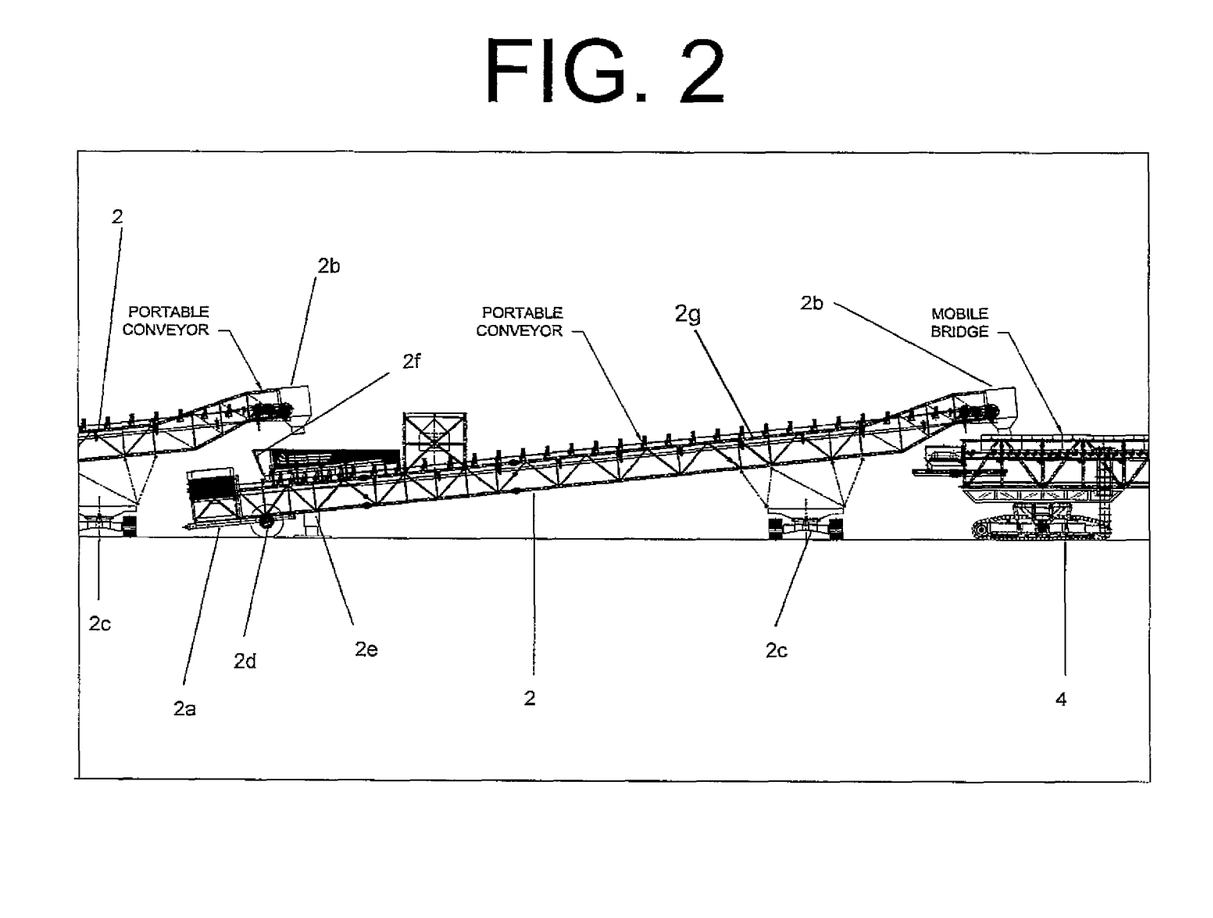
FIG. 2 is a fragmentary side view of the first present preferred material handling system illustrating a portable conveyor positioned for feeding material to a mobile bridge conveyor so that the material may be transported to a stacker for stacking the material.

As may be appreciated from FIG. 2, each portable conveyor 2 includes a conveyor device that has a frame that supports a continuous belt that is moved for conveying material from a tail end 2a to a discharge end 2b. The portable conveyor 2 may have a hopper 2f for receiving material from the discharge head of another portable conveyor adjacent to the tail end of the portable conveyor. Each portable conveyor may have a rotatable track 2c (i.e.—the at least one track assembly) that is positioned adjacent to the discharge end of the portable conveyor 2 and may have wheels 2d positioned adjacent to the tail end 2a. A retractable hydraulic foot 2e may be positioned adjacent to the wheels 2d and be attached to the frame as well. The hydraulic foot 2e is extendable to support the weight of the frame adjacent the wheels 2d after the portable conveyor is moved to a desired position so that a substantial amount of weight is not supported by the wheels, but is instead supported by the foot 2e. The hydraulic foot 2e may be configured so that the frame may rotate relative to the hydraulic foot 2e to permit the portable conveyor 2 to be pivoted about the hydraulic foot 2e via movement of the rotatable tracks 2c. The frame of the portable conveyor may be configured so that the conveyor belt 2g is inclined and extends upwardly from the wheels 2d to the discharge head 2b. In some alternative embodiments of the portable conveyor 2, the hydraulic foot 2e and the wheels 2d could be replaced with a track assembly or a rotatable track assembly (i.e.—like that shown as 2c).

Figure 3:
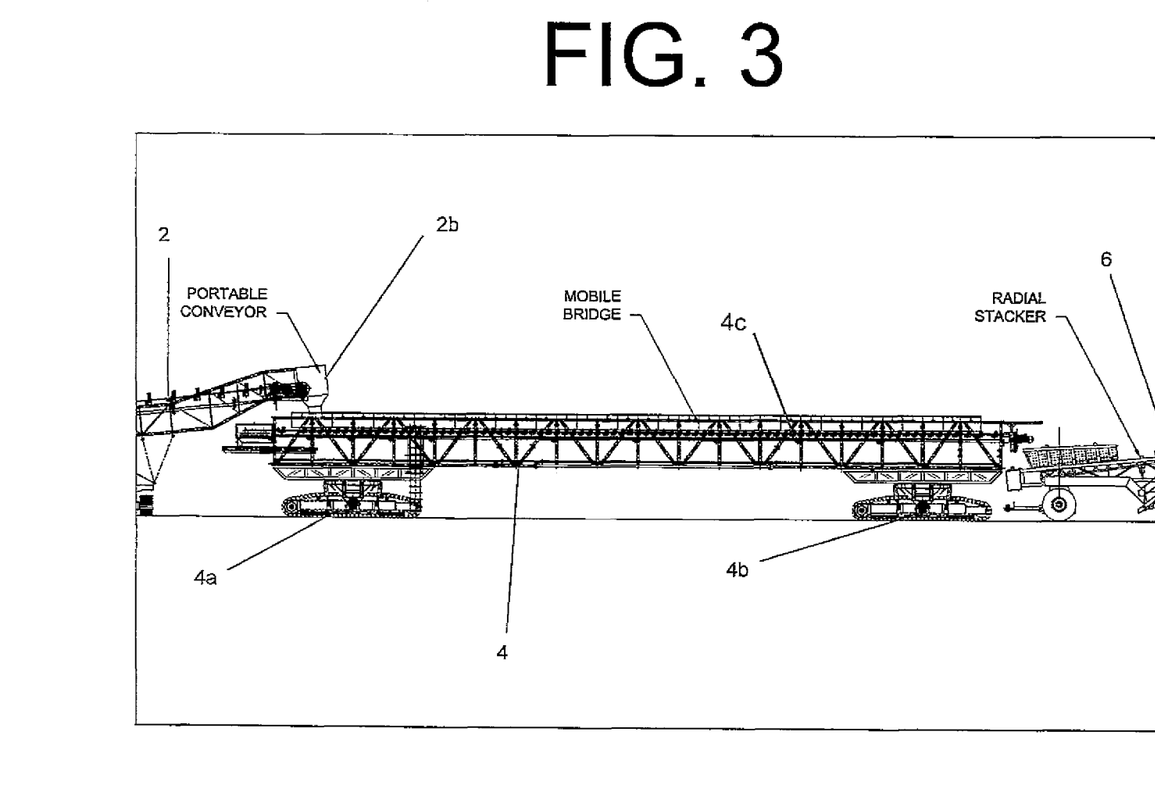
FIG. 3 is a fragmentary side view of the first present preferred material handling system illustrating a mobile bridge conveyor that may transport material to the stacker.

As may be appreciated from FIG. 3, the mobile bridge conveyor 4 may have a frame that supports a continuous conveyor belt 4c that is moveable for feeding material to a radial stacker. The mobile bridge conveyor may have tracks positioned adjacent to each end of the mobile bridge conveyor 4 to permit the mobile bridge conveyor to move. One or both of the tracks 4a may be rotatable. The mobile bridge conveyor may have a frame that is configured to permit material to be moved substantially horizontally along the conveyor belt 4c. In alternative arrangements, the frame may be configured to permit an inclined or declined arrangement for feeding material to another device, such as the stacker 6.

Figure 4:
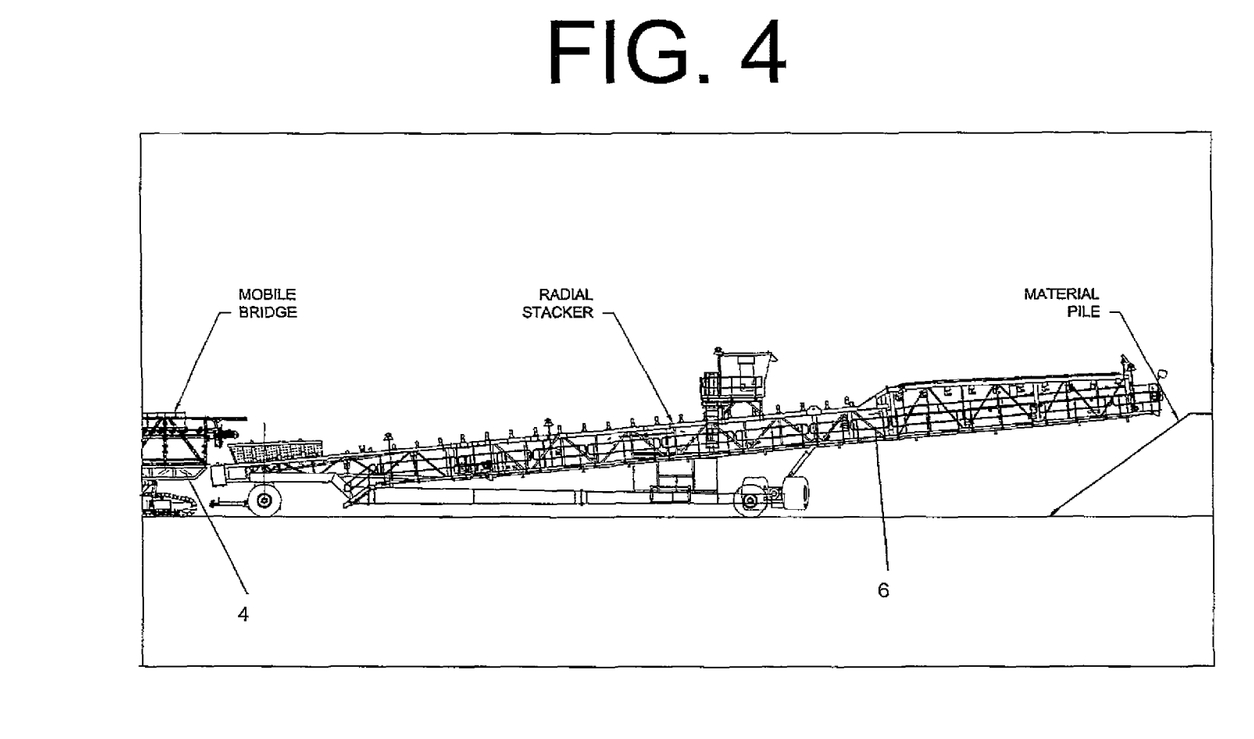
FIG. 4 is a fragmentary side view of the first present preferred material handling system illustrating the stacker, which may receive material from the mobile bridge conveyor for stacking the material into a pile in a storage area.
Figure 5:
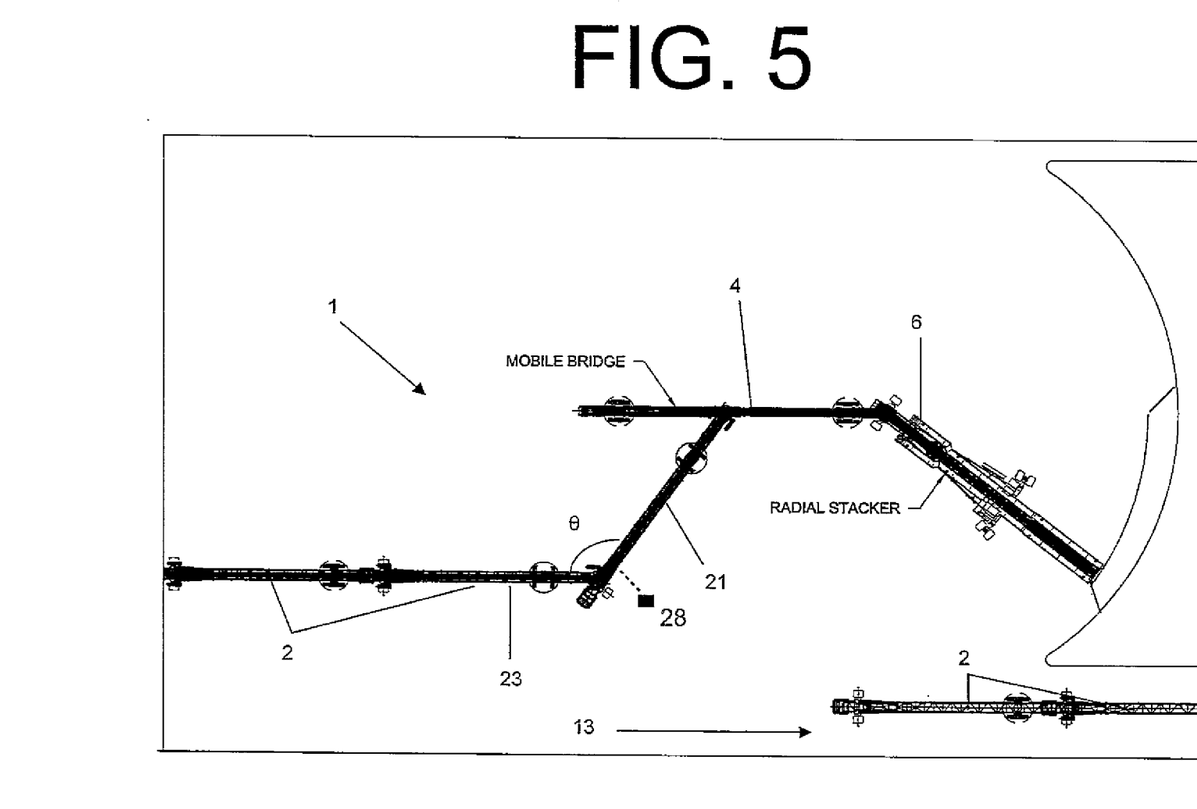
FIG. 5 is a top view of the first present preferred material handling system illustrating the stacker, mobile bridge and a plurality of portable conveyors in an initial position for stacking material.
Figure 6:
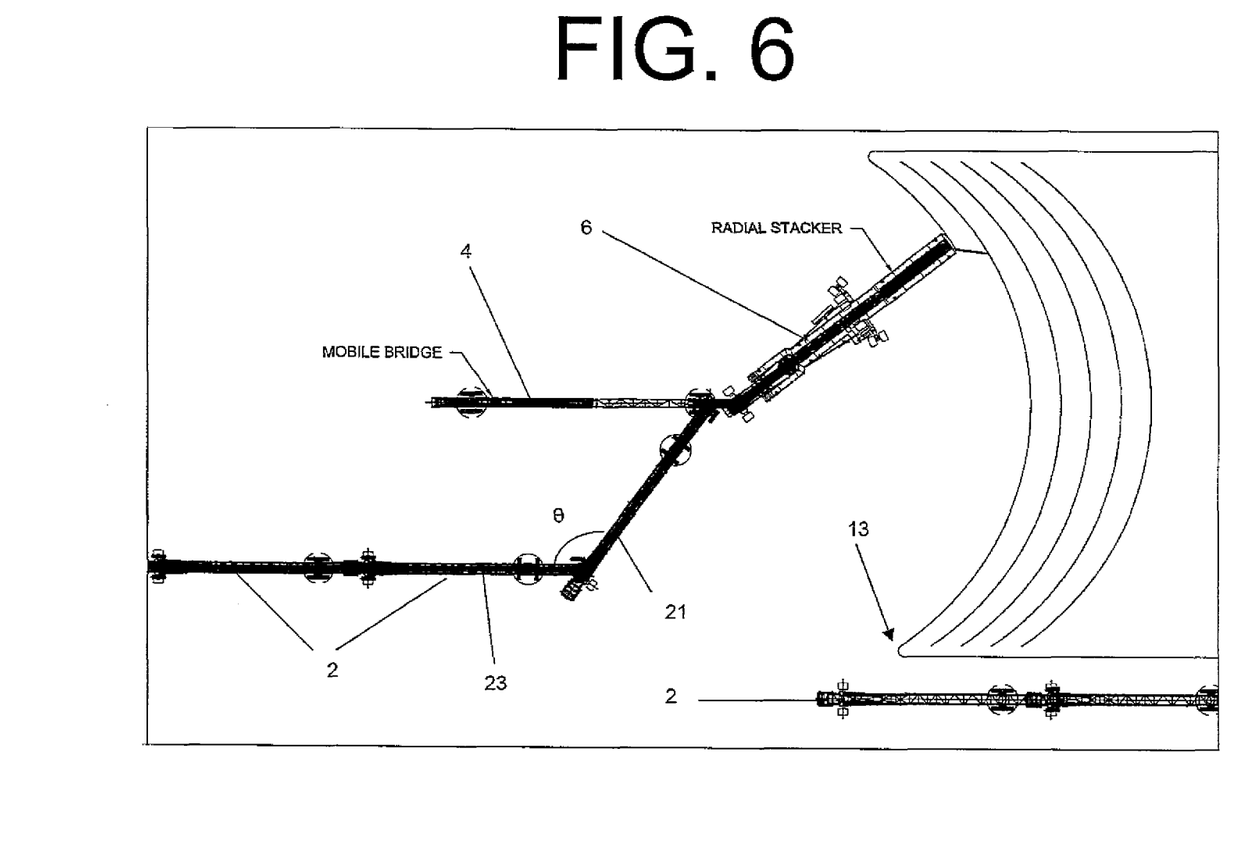
FIG. 6 is a top view similar to FIG. 5 illustrating the stacker, mobile bridge and a plurality of portable conveyors in a second position as stacking operation proceeded and the stacker and mobile bridge conveyor have subsequently retreated from their initial position.
Figure 7:
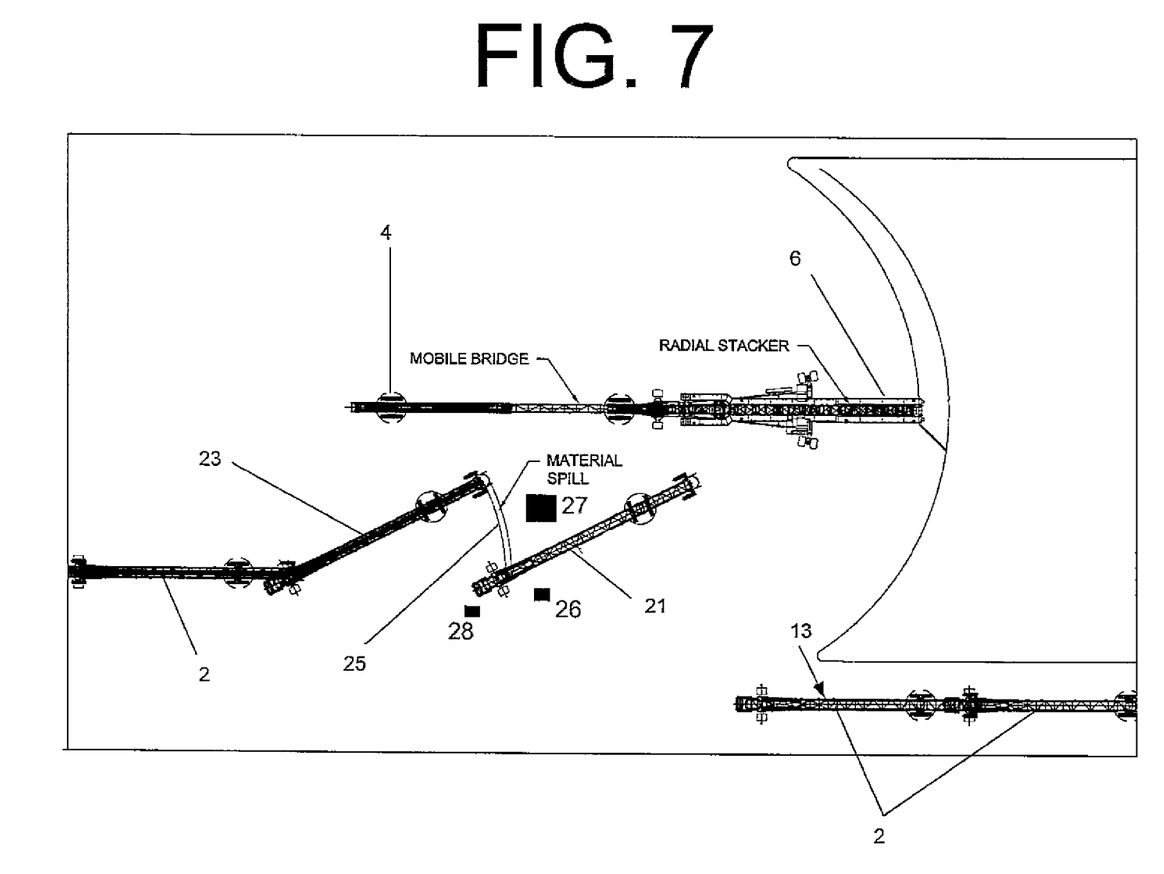
FIG. 7 is a top view similar to FIGS. 5 and 6 illustrating a portable conveyor being removed and another portable conveyor moving to feed material to the mobile bridge conveyor for stacking the material via the stacker. Material may be spilt as the portable conveyor moves for feeding material. The removed portable conveyor may be moved to a new string of portable conveyors positioned for a later stacking operation in a cell adjacent to the cell in which the stacker is stacking material.
Figure 8:
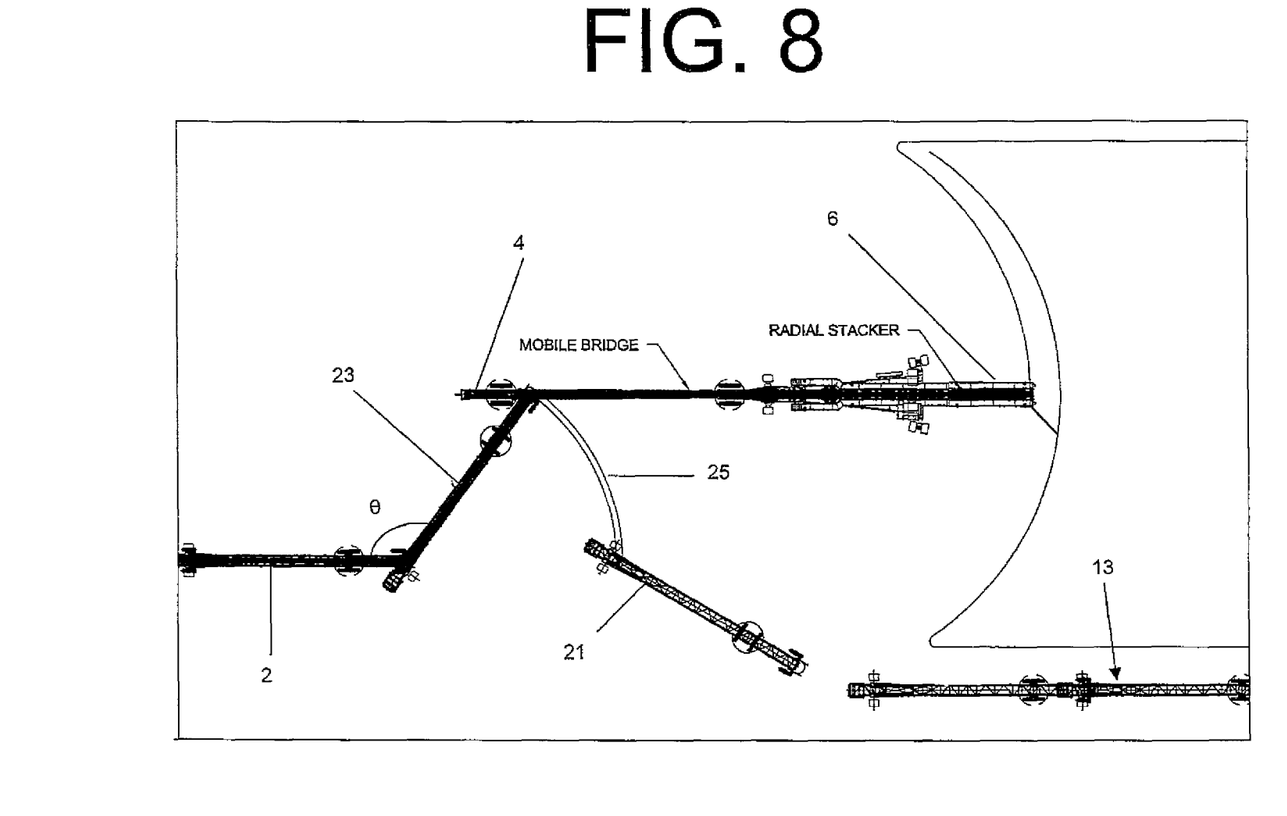
FIG. 8 is a top view similar to FIGS. 5-7 illustrating the removed portable conveyor progressing toward the string of other portable conveyors in an adjacent cell and the new rotated portable conveyor being positioned for feeding material to the mobile bridge conveyor.
Figure 9:
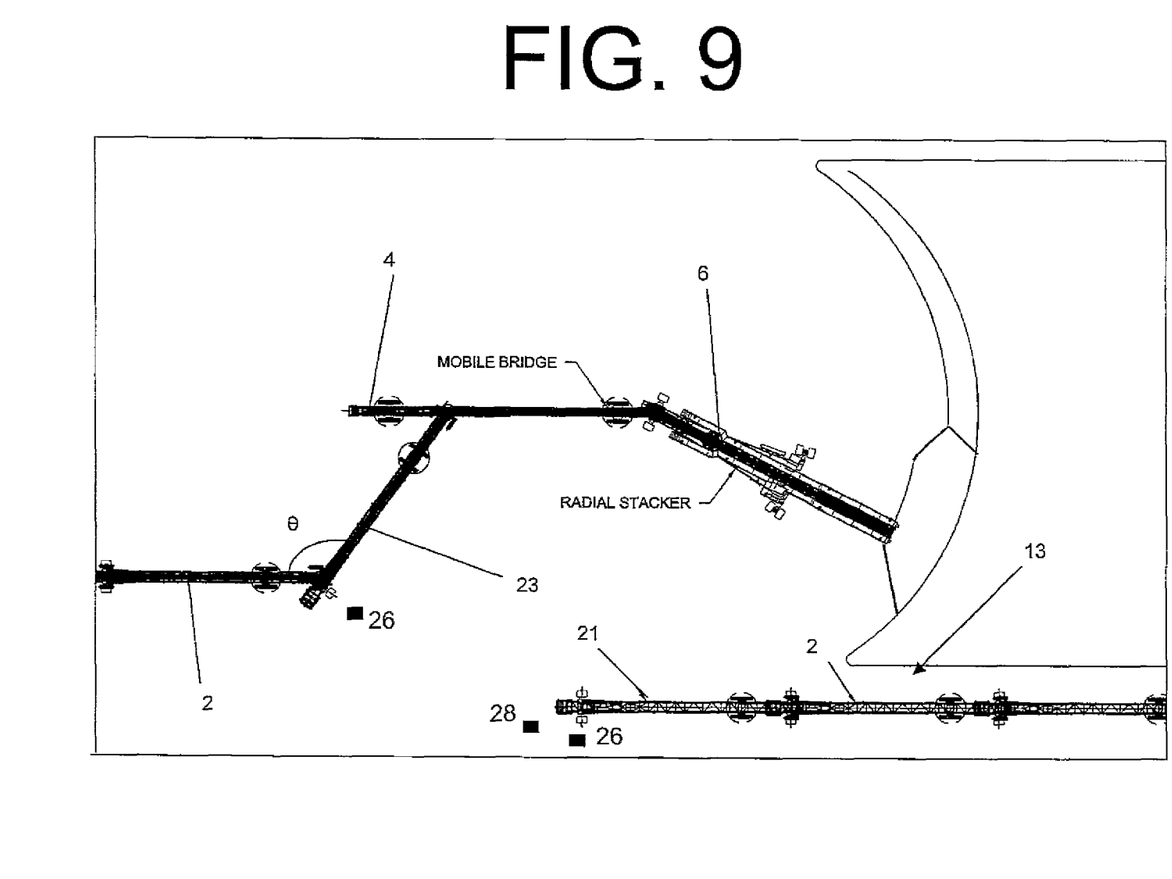
FIG. 9 is a top view similar to FIGS. 5-8 illustrating the removed portable conveyor in its new position as part of string of portable conveyors positioned to facilitate future stacking operations in an adjacent cell while the stacker continues to feed material from a new position. As may be appreciated from comparing FIGS. 8 and 9, the stacker and mobile bridge conveyor have retreated during stacking operations while the removed portable conveyor moved to its new position.

As may be seen from FIG. 4, the stacker 6 is positioned to receive material from the mobile bridge conveyor and is configured to stack material in a storage area. The stacker 6 may be a radial stacker, for example. The stacker 6 could be any of a number of conventional stackers and may utilize an extendable discharge head. In some embodiments, the stacker may be connected to the mobile bridge conveyor so that movement of the mobile bridge conveyor also moves the stacker 6. In other embodiments, the stacker may not be connected to the mobile bridge conveyor 4 and merely be positioned adjacent to the mobile bridge conveyor for receiving material from the mobile bridge conveyor 4.

Referring to FIGS. 5-9, operation of the system 1 may be explained so that an appreciation of advantages provided by the portable conveyors 2 of the system 1 may be better understood. A string of portable conveyors 2 may extend from adjacent an overland feed conveyor or other material feeding device to the mobile bridge conveyor 4. A first portable conveyor 21 may be positioned to extend at an angle θ from the discharge head of a second portable conveyor 23 to the mobile bridge conveyor 4 so that material can be fed from the string of portable conveyors to the stacker 6 via the mobile bridge conveyor 4. The angle θ is preferably between 120 and 150 degrees. Of course, the angle θ could have alternate values to meet a particular design objective or storage cell layout.

Over the course of a reverse stacking operation, the stacker 6 and mobile bridge conveyor 4 may retreat, or move backwards away from the pile of material being stacked. As may be appreciated from FIGS. 6-7, at some point the position of the discharge head of the first portable conveyor 21 will reach a predetermined position being a certain distance away from the end of the mobile bridge conveyor 4 that feeds the material to the stacker 6. When it is detected that the discharge end of the first portable conveyor is at or within this predetermined distance from the discharge end of the mobile bridge conveyor, the first portable conveyor 21 retracts its hydraulic foot 2e and moves away from the mobile bridge conveyor 4 and the stacker 6, as may be appreciated from FIGS. 7-9. At about the same time, the second portable conveyor 23 is pivoted, or rotated, about its hydraulic foot 2e toward the mobile bridge conveyor via movement of its tracks 2c positioned away from the hydraulic foot and adjacent the discharge end 2b of the conveyor as may be understood from FIGS. 7-9. The tracks 2c may drive the rotation of the second portable conveyor 23. In alternative embodiments, the second portable conveyor 23 may begin rotating after the first portable conveyor 21 has moved some predetermined distance away from the second portable conveyor 23.

The detection of the positioning of an end of the mobile bridge conveyor being at or within a predetermine distance of the discharge end of a portable conveyor may be made by sensors, such as position or location sensors connected to a controller. For example, the controller may determine via one or more sensors positioned on a discharge end 2b of the conveyor when the portable conveyor 2 is positioned within a predetermined distance of the discharge end of the mobile bridge conveyor and, if this position is reached, initiate movement of the portable conveyor away from the mobile bridge conveyor 4. One or more sensors or detectors may alternatively be attached to a hopper of the mobile bridge conveyor for providing such a detection and communicating such a detection to the portable bridge conveyor. As another option, sensors may be provided on both the discharge end 2b of the portable conveyor and on or adjacent a discharge end of the mobile bridge conveyor for providing such a detection. As yet another alternative, a user or operator may visually detect such a condition as occurring and subsequently initiate the moving of the first and second portable conveyors 21 and 23.

It should be understood that the material being fed along the portable conveyors 2 is not stopped or halted as a result of the movement of the first portable conveyor 21 or rotation of the second portable conveyor 23. Instead, material continues to be moved along the belts of the portable conveyors 2. As a result, material 25 may be fed out of the discharge end of the second portable conveyor 23 as it pivots about its hydraulic foot 2e via tracks 2c. The spilled material 25 may be subsequently moved by bulldozers 27 or other equipment to the pile or may be merely left as is after the first portable conveyor 21 is moved to a new location and the second portable conveyor is rotated to its new position for feeding material to the mobile bridge conveyor 4.

While in the string of portable conveyors, each portable conveyor may be powered by electricity that is connected to each separate device by its own plug or extension cord. When the first portable conveyor 21 is desired to be moved, the first portable conveyor may be connected to a portable generator 26 that is powered via battery power, natural gas, gasoline, or other types of fuel sources. The portable generator 26 may be connected to the first portable conveyor 21 to provide power to the first portable conveyor 21. After the portable generator 26 is connected to the first portable conveyor and the first portable conveyor is powered by the generator 26, the first portable conveyor 21 may be disconnected from the hard wired plug, or extension plug that (i.e.—the wired power source 28) had previously been providing electricity for powering its operations. Thereafter, the first portable conveyor may be moved to a new location via movement of the tracks 2c.

For example, the hydraulic system of the portable conveyor may be powered via the generator so that the hydraulic foot 2e is retractable to permit the tracks 2c to more easily push or pull the conveyor to move the first portable conveyor 21 to a new location. Retraction of the hydraulic foot 2e permits the wheels 2d to more easily rotate and helps facilitate the movement of the conveyor driven by the tracks 2c. Preferably, the first portable conveyor is moved to a second string 13 of portable conveyors located at another cell of the storage area. When the first portable conveyor 21 is positioned in the second string 13 of portable conveyors in the adjacent storage cell, as may be seen from FIG. 9, an extension cord or other cord or connector may be plugged into the first portable conveyor to power the first portable conveyor via electricity.

The portable generator 26 may then be removed from the first portable conveyor 21 and moved near the second portable conveyor so that the portable generator 26 is able to be used to help facilitate the moving of the second portable conveyor 23 when needed. The portable generator 26 may be refueled or otherwise recharged during this time as well. In some embodiments, only one portable generator 26 may be needed as it can be repeatedly transferred to a new portable conveyor to power each removal of a portable conveyor in a string of portable conveyors during retreat stacking operations.

It should be appreciated that the removal of the second portable conveyor 23 and any other portable conveyor during the retreat stacking operation of the stacker 6 may occur similarly to the removal of the above discussed first portable conveyor 21. It should also be understood that cross conveyor devices typically needed for grasshopper conveyor systems are not needed when using certain embodiments of the present system 1. The elimination of such a device helps reduce the costs associated with such systems and eliminates the need to move another large, bulky device when performing stacking operations.

The second string 13 of portable conveyors may be positioned for use in subsequent stacking operations that may take place in a cell adjacent to the stacker 6. The second string of portable conveyors may be positioned so that a stacker's move to a new cell for resuming stacking operations may occur more quickly after the stacker is finished stacking material in the cell 7 in which the stacker was stacking material. As portable conveyors 2 are removed, they may be repositioned in the second string 13 as was discussed above with reference to the first portable conveyor 21 to help form a string of portable conveyors for feeding material needed for stacking operations in the adjacent cell 7. Such movement can help save time and make the moving of the stacker 6 to a new cell occur more quickly as only a few elements (e.g. the stacker and mobile bridge conveyor) may need to be repositioned before stacking operations can be resumed. This may be particularly advantageous since movement of the stacker can take a significant amount of time and require the material handling operations to cease during this repositioning time. Such repositioning time often represents a significant cost to the operator of the material handling operations. It should be appreciated that the mobile bridge conveyor 4 may be repositioned at the same time the stacker 6 is repositioned.

It should be understood that a number of different alternative designs may be utilized in different embodiments of the material handling system For instance, any of a number of different conventional mobile bridge conveyors or stackers could be used in connection with the portable conveyors. Additionally, the portable conveyors, mobile bridge conveyor and stacker could each utilize a hopper or mobile hopper to help facilitate receipt of material and may utilize a guide or other element to help feed discharged material to another device to minimize spilling of material. As another example, the size and capacity of the portable conveyors could be any of a number of different sizes and capacities to meet a particular design objective. As yet another example, the material that is handled could be any of a number of different types of material, such as minerals, ore, agglomerated material, dirt, sand, stone, or rock.

While certain present preferred embodiments of the material handling system and certain embodiments of methods of practicing the same have been shown and described, it is to be distinctly understood that the invention is not limited thereto but may be otherwise variously embodied and practiced within the scope of the following claims.

What is claimed is:

1. A material handling system comprising:
    a plurality of portable conveyors, each of the portable conveyors comprising a frame and at least one track assembly attached to the frame, each of the portable conveyors having a first end and a second end opposite the first end, the at least one track assembly positioned adjacent to the second end;
    a mobile bridge conveyor; and
    a stacker, the stacker positionably adjacent to the mobile bridge conveyor to receive material from the mobile bridge conveyor for stacking the material in a storage area;
    the portable conveyors comprising a first portable conveyor and a second portable conveyor, the first end of the first portable conveyor being positionably adjacent the second end of the second portable conveyor to receive material from the second portable conveyor, the first portable conveyor also being positionable to extend on an angle relative to the second portable conveyor toward the mobile bridge conveyor to feed material from the second end of the first portable conveyor to the mobile bridge conveyor;
    the first portable conveyor moving away from the mobile bridge conveyor, the second portable conveyor, and the stacker when an end of the mobile bridge conveyor that feeds the stacker is detected as being at or within a predetermined distance of the second end of the first portable conveyor; and
    the second portable conveyor rotating via the at least one track assembly such that the second end of the second portable conveyor moves toward the mobile bridge conveyor until reaching a feeding position in which the material being fed from the second end of the second portable conveyor is fed to the mobile bridge conveyor.

2. The system of claim 1 wherein the frame of each portable conveyor is arranged to support a conveyor belt that extends from the first end to the second end along an inclined path such that a portion of the conveyor belt adjacent the first end is lower than a portion of the conveyor belt adjacent the second end.

3. The system of claim 2 wherein each of the portable conveyors also comprises at least one moveable foot positioned adjacent to the first end, the at least one moveable foot moveable from a retracted position to an extended position;
    the at least one moveable foot of the second portable conveyor being in the extended position to support the first end of the second portable conveyor prior to the second portable conveyor rotating toward the mobile bridge conveyor; and
    the at least one moveable foot of the first portable conveyor being retracted to the retracted position prior to moving away from the second portable conveyor, the mobile bridge conveyor, and the stacker.

4. The system of claim 1 further comprising a portable generator connectable to the first portable conveyor to power the first portable conveyor prior to the first portable conveyor moving away from the second portable conveyor, the mobile bridge conveyor, and the stacker.

5. The system of claim 1 wherein the stacker is a radial stacker and the mobile bridge conveyor has a plurality of tracks attached to a frame that supports a substantially horizontal conveyor belt, the conveyor belt feeding the material to the stacker.

6. The system of claim 1 wherein the portable conveyors also comprise a third portable conveyor, the first end of the second portable conveyor adjacent to the second end of the third portable conveyor to receive the material from the third portable conveyor;
the second portable conveyor extending from the second end of the third portable conveyor towards the mobile bridge conveyor at an angle relative to the second end of the third portable conveyor when in the feeding position.

7. The system of claim 6 wherein the second portable conveyor moves away from the mobile bridge conveyor, the third portable conveyor, and the stacker when an end of the mobile bridge conveyor that feeds the stacker is detected as being at or within a predetermined distance of the second end of the second portable conveyor; and
while the second portable conveyor moves away from the third portable conveyor, the mobile bridge conveyor and the stacker, the third portable conveyor rotating via the at least one track assembly such that the second end of the third portable conveyor moves toward the mobile bridge conveyor until reaching a feeding position in which material being fed from the second end of the third portable conveyor is fed to the mobile bridge conveyor.

8. The system of claim 1 wherein the first portable conveyor is moved away from the second portable conveyor, the mobile bridge conveyor, and the stacker and positioned adjacent to a string of portable conveyors located in a storage cell of the storage area adjacent to a storage cell in which the stacker stacks material.

9. The system of claim 1 wherein material is fed along the second portable conveyor as it rotates towards the mobile bridge conveyor such that material is discharged from the second end of the second portable conveyor prior to the second portable conveyor being positioned in the feeding position when the second portable conveyor rotates toward the feeding position; and
wherein the second portable conveyor begins rotating toward the feeding position after the first portable conveyor begins moving away from the second portable conveyor, the mobile bridge conveyor, and the stacker.

10. The system of claim 9 further comprising at least one bulldozer for moving spilled material discharged from the second portable conveyor when rotating to the feeding position.

11. A method for stacking material comprising:
providing a plurality of portable conveyors, the portable conveyors comprising a first portable conveyor and a second portable conveyor;
arranging the portable conveyors in a string of portable conveyors for transporting material via the portable conveyors to a mobile bridge conveyor;
the mobile bridge conveyor feeding the material to a stacker;
the stacker and the mobile bridge conveyor moving away from a pile of material being stacked while the stacker stacks the material in a storage area;
the first portable conveyor feeding material to the mobile bridge conveyor for the material to be stacked via the stacker until a discharge end of the mobile bridge conveyor is at or within a predetermined distance of a discharge end of the first portable conveyor;
the second portable conveyor feeding material to the first portable conveyor for feeding to the mobile bridge conveyor until a discharge end of the mobile bridge conveyor is at or within a predetermined distance of a discharge end of the first portable conveyor;
the first portable conveyor moving away from the mobile bridge conveyor, the second portable conveyor, and the stacker after the discharge end of the mobile bridge conveyor is at or within the predetermined distance of the discharge end of the first portable conveyor; and
the second portable conveyor rotating such that a discharge end of the second portable conveyor is moved towards the mobile bridge conveyor until reaching a feeding position for feeding material to the mobile bridge conveyor.

12. The method of claim 11 further comprising the second portable conveyor extending a moveable foot adjacent to a tail end of the second portable conveyor that is opposite the discharge end of the second portable conveyor to support the second portable conveyor prior to the second portable conveyor rotating to the feeding position.

13. The method of claim 12 further comprising the first portable conveyor retracting a moveable foot prior to moving away from the mobile bridge conveyor, the stacker, and the second portable conveyor.

14. The method of claim 13 wherein the first portable conveyor has a frame that supports an inclined conveyor belt that extends from a tail end upwardly to the discharge end of the first portable conveyor and wherein the second portable conveyor has a frame that supports an inclined conveyor belt that extends upwardly from the tail end of the second portable conveyor to the discharge end of the second portable conveyor.

15. The method of claim 11 wherein the portable conveyors also comprise a third portable conveyor, the method further comprising:
the second portable conveyor moving away from the mobile bridge conveyor and the stacker when the discharge end of the mobile bridge conveyor that feeds the stacker is detected as being at or within a predetermined distance of the discharge end of the second portable conveyor; and
while the second portable conveyor moves away from the mobile bridge conveyor and the stacker, the third portable conveyor rotating such that a discharge end of the third portable conveyor moves toward the mobile bridge conveyor until reaching a feeding position so that the third portable conveyor feeds material to the mobile bridge conveyor when in the feeding position.

16. The method of claim 11 further comprising connecting a portable generator to the first portable conveyor prior to moving the first portable conveyor away from the mobile bridge conveyor and the stacker.

17. The method of claim 11 further comprising disconnecting a wired power source from the first portable connector prior to moving the first portable conveyor away from the mobile bridge conveyor and the stacker.

18. The method of claim 11 further comprising discharging material from the discharge end of the second portable conveyor as it rotates towards the mobile bridge conveyor for being positioned in the feeding position such that material is discharged from the second end of the second portable conveyor prior to the second portable conveyor being positioned in the feeding position.

19. The method of claim 18 wherein the rotating of the second portable conveyor occurs while the first portable conveyor is moving away from the stacker and the mobile bridge conveyor.

20. The method of claim 18 further comprising moving the material discharged from the second end of the second portable conveyor prior to the second portable conveyor being positioned in the feeding position to a pile of material being stacked by the stacker.

\* \* \* \* \*